Patented Jan. 2, 1923.

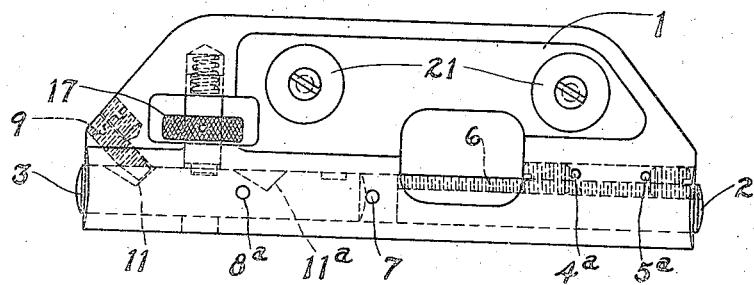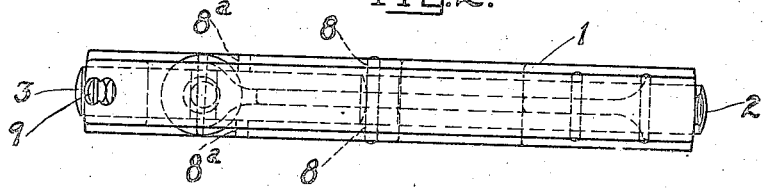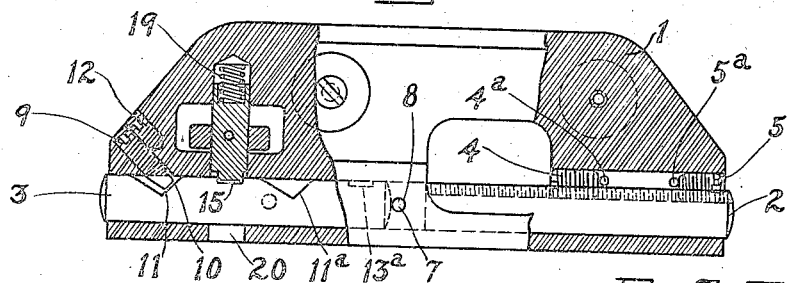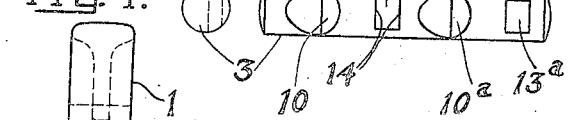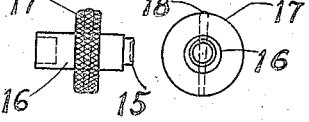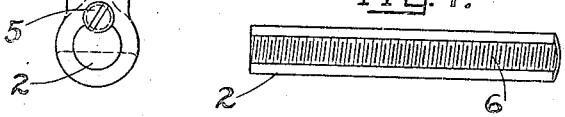

1,440,442

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

ADJUSTABLE LIMIT GAUGE.

Application filed April 25, 1921. Serial No. 464,129.

*To all whom it may concern:*

Be it known that I, BRYANT H. BLOOD, a citizen of the United States, residing at Hartford, in the county of Hartford and State of Connecticut, have invented certain new and useful Improvements in Adjustable Limit Gauges, of which the following is a specification.

This invention relates to gauges and particularly to improvements in pin gauges of the type adapted to be used to determine the dimensions of cylindrical holes or other internal dimensions.

One object of the invention is to provide a gauge of this type in which means is provided for moving one of the gaging pins longitudinally in the gauge frame between stop means operative on the pin and preferably adjustable.

Another object of the invention is to provide a simple and accurate cam means for positively moving the movable gauge pin in both directions.

Another object of the invention is to provide means whereby the movable gaging pin moving means may be associated with the movable pin in two definite relatively spaced positions longitudinally of the pin whereby the gauge may be set to measure widely varying dimensions.

Another object of the invention is to provide the above defined mechanism in combination with a gauge having a second gaging pin, preferably in axial alignment with the movable pin, and to provide means for adjusting the second pin whereby the gauge may be set to measure widely varying dimensions.

With the above and other objects in view, my invention consists in the features of construction and operation set forth in the following specification and illustrated in the accompanying drawing. In such drawing annexed hereto and forming a part of this specification, I have shown my invention as embodied in a gauge for measuring internal dimensions but it will be understood that the invention can be otherwise embodied and that the drawing is not to be construed as defining or limiting the scope of the invention, the claims appended to this specification being relied upon for that purpose.

Referring to the figures of the drawing:

Figure 1 is a side elevation of a gauge comprising the invention.

Fig. 2 is a rear elevation thereof.

Fig. 3 is a view similar to Fig. 1 but showing portions thereof in section.

Fig. 4 is an end view of the gauge.

Figs. 5 and 6 illustrate respectively end and side elevations of the movable gaging pin.

Figs. 7 and 8 illustrate respectively side and end elevations of the means for moving the movable pin.

Fig. 9 is an elevation of the adjustable gaging pin.

My invention is particularly applicable to limit gauges either of the internal or external type. A gauge embodying the invention comprises a frame and two opposite contact pins at opposite ends of the frame, one pin preferably being movable longitudinally through a definite predetermined small distance and the other pin preferably being longitudinally adjustable.

In the drawing 1 represents the gauge frame and 2 and 3 represent the two gaging pins. When the gauge is intended for determining internal dimensions, the frame extends directly along straight lines from one pin to the other. As illustrated, the frame is preferably formed to provide a portion at one side thereof for receiving the gaging pins and a portion at the other side thereof adapted to be gripped by the hand of the operator.

The pin 2 is preferably longitudinally adjustable with respect to the frame 1 and a pair of screws 4 and 5 abutting against pins 4$^a$ and 5$^a$ and threadedly engaging the pin 2 at 6 are provided for effecting this adjustment. By this means the pin 2 can be adjusted to the desired position longitudinally and by tightening the screws 4 and 5, the pin is held secured against movement in either direction.

The pin 3 is adapted to move longitudinally between normally fixed stops, one of which is preferably adjustable. As illustrated in the drawing, a pin 7 fitting in holes 8 in the gauge frame comprises the inner stop and a screw 9 comprises the outer and adjustable stop. The screw is adjustable toward and from a surface 10 formed by a notch 11 cut in the pin and a locking screw 12 is provided for securing the screw 9 in its adjusted position.

The means for moving the pin 3 between the stops preferably comprises a rotary eccentric or cam member operatively connected to the pin. I have illustrated the pin as formed with a notch 13 providing a pair of transverse shoulders 14 between which an eccentric portion 15 on a rotary adjusting element 16 is adapted to fit. A knurled knob 17 is secured to the element 16 by means of a pin 18 whereby the element may be turned. A spring 19 normally keeps the eccentric 15 seated in the notch 13. It will be seen that rotation of the knob 17 in one direction or the other is adapted to move the pin to engage the stops.

The pin 3 is illustrated as provided with a second pair of notches 11$^a$ and 13$^a$ corresponding to but spaced from the notches 11 and 13. The gauge frame is also provided with a second pair of holes 8$^a$ for receiving the pin 7. By moving the pin 3 outwardly to a position wherein the notch 11$^a$ comes opposite the screw 9 and engaging the element 16 with the notch 13$^a$ and placing the pin 7 in the holes 8$^a$, the measuring length of the gauge may be considerably extended. In this position of the pin 3, the stop 9 acts against surface 10$^a$. A hole 20 is provided in the gauge for initially receiving the pin 16 in the assembling operation. The gauge may be provided with disks 21 for marking the same, if desired.

In operation the gaging pins 2 and 3 are first set to approximately the dimension it is desired to measure. The gaging pin 3 is then placed in position against the stop pin 7 as illustrated in Fig. 1. The gaging pin 2 is then adjusted accurately to the minimum dimension of the distance to be measured. The screw 9 is thereafter set to permit a movement of the pin 3 equal to the tolerance to be allowed between the minimum and maximum measuring dimensions. The operator may thereafter use the gauge for measuring the minimum and maximum dimensions merely by rotating the knob 17.

What I claim is:

1. A gauge for determining dimensions comprising in combination, a frame, a contact pin at one end of the frame, a contact pin at the other end of the frame and movable inward or outward with respect thereto, and means for moving the movable pin comprising an element rotatable about an axis perpendicular to the said pin and having a cam surface eccentric to its axis of rotation engaging the pin to positively move the same an adjustable limited distance in both directions.

2. A gauge for determining dimensions comprising in combination, a frame, a contact pin at one end of the frame, a contact pin at the other end of the frame and movable inward or outward with respect thereto, the movable pin having a recess in the side thereof, and means for moving the movable pin an adjustable limited distance comprising an element rotatable about an axis perpendicular to the said pin and having a cam surface eccentric to the axis of rotation engaging in the said recess.

3. A gauge for determining dimensions comprising in combination, a frame, a contact pin at one end of the frame, a contact pin mounted for free sliding movement in the other end of the frame, two stops for determining the limits of movement of the movable pin, and means for positively moving the said pin from each limit position to the other.

4. A gauge for determining dimensions comprising in combination, a frame, a contact pin at one end of the frame, a contact pin at the other end of the frame and movable inward or outward with respect thereto, two stops operative on the movable pin for determining the limits of movements thereof, and means for positively moving the said pin from each limit position to the other.

5. A gauge for determining dimensions comprising in combination, a frame, a contact pin at one end of the frame, a contact pin at the other end of the frame and movable inward or outward with respect thereto, two stops for determining the limits of movement of the movable pin, and means for positively moving the said pin from either limit position to the other comprising an element rotatable about an axis perpendicular to the said pin and having a cam surface eccentric to its axis of rotation engaging the pin.

6. A gauge for determining dimensions comprising in combination, a frame, a contact pin at one end of the frame, a contact pin at the other end of the frame and movable inward or outward with respect thereto, two stops for determining the limits of movement of the movable pin, one stop being adjustable to vary the longitudinal movement of the pin, and means for moving the said pin from one limit position to the other comprising an element rotatable about an axis perpendicular to the said pin and having a cam surface eccentric to its axis of rotation engaging the pin.

7. A gauge for determining dimensions comprising in combination, a frame, a contact pin at one end of the frame, a contact pin at the other end of the frame and movable inward or outward with respect thereto, means for moving the movable pin comprising an element rotatable about an axis perpendicular to the said pin, and means associated with the said movable pin for limiting the longitudinal movement thereof in both directions.

8. A gauge for determining dimensions comprising in combination, a frame, a contact pin at one end of the frame, a contact pin at the other end of the frame and movable inward or outward with respect thereto, two stops associated with the movable pin for determining the limits of movement thereof, screw threads on one of said stops engaging screw threads on said frame for adjusting one stop longitudinally of the pin, and means for moving the said pin from one limit position to the other comprising an element rotatable about an axis perpendicular to the said pin and having a cam surface eccentric to its axis of rotation engaging the pin.

9. A gauge for determining dimensions comprising in combination, a frame, a contact pin at one end of the frame, a contact pin at the other end of the frame and movable inward or outward with respect thereto, means for moving the movable pin comprising an element rotatable about an axis perpendicular to the said pin, and means for associating the moving means with the movable pin in two definite relatively spaced positions longitudinally of the pin whereby the gauge may be set to measure widely varying dimensions.

10. A gauge for determining dimensions comprising in combination, a frame, a contact pin at one end of the frame, a contact pin at the other end of the frame and movable inward or outward with respect thereto, means for moving the movable pin comprising an element rotatable about an axis perpendicular to the said pin and having a cam surface eccentric to its axis of rotation engaging the pin, and transverse shoulders formed in spaced relation longitudinally on the movable pin, either shoulder being adapted to be engaged by the said cam surface whereby the gauge may be set to measure widely varying dimensions.

11. A gauge for determining dimensions comprising in combination, a frame, a contact pin at one end of the frame, a contact pin at the other end of the frame and movable inward or outward with respect thereto, means for moving the movable pin comprising an element rotatable about an axis perpendicular to the said pin and having a cam surface eccentric to its axis of rotation engaging the pin, transverse shoulders formed in spaced relation longitudinally on the movable pin, either shoulder being adapted to be engaged by the said cam surface whereby the gauge may be set to measure widely varying dimensions, and means for limiting the longitudinal movement of the pin by the said cam surface.

12. A gauge for determining dimensions comprising in combination, a frame, a contact pin at one end of the frame, a contact pin at the other end of the frame and movable inward or outward with respect thereto, means for moving the movable pin comprising an element rotatable about an axis perpendicular to the said pin and having a cam surface eccentric to its axis of rotation engaging the pin, transverse shoulders formed in spaced relation longitudinally on the movable pin, either shoulder being adapted to be engaged by the said cam surface whereby the gauge may be set to measure widely varying dimensions, and stop means for limiting the longitudinal movement of the pin by the said cam surface in both directions, the stop means being adjustable to vary the limiting position of the pin in one direction.

13. A gauge for determining dimensions comprising in combination, a frame, a contact pin at one end of the frame, a contact pin at the other end of the frame and movable inward or outward with respect thereto, means for moving the movable pin comprising an element rotatable about an axis perpendicular to the said pin and having a cam surface eccentric to its axis of rotation engaging the pin, transverse shoulders formed in spaced relation longitudinally on the movable pin, either shoulder being adapted to be engaged by the said cam surface whereby the gauge may be set to measure widely varying dimensions, and stop means associated with the pin in either of its set positions for limiting the longitudinal movement of the pin by the said cam surface, certain of such means being adjustable to vary the limiting position of the pin.

14. A gauge for determining dimensions comprising in combination, a frame, a contact pin at one end of the frame, means for adjusting the said pin inward or outward and locking it in adjusted position, a contact pin at the other end of the frame and movable inward or outward with respect thereto, means for moving the movable pin comprising an element engaging the movable pin and rotative relative thereto to positively move the same in both directions, and two stops for limiting the movement of the movable pin.

15. A gauge for determining dimensions comprising in combination, a frame, a contact pin at one end of the frame, means for adjusting the said pin inward or outward and locking it in adjusted position, a contact pin at the other end of the frame and movable inward or outward with respect thereto, means for moving the movable pin comprising an element engaging the movable pin and rotative relative thereto to positively move the same in both directions, and means associated directly with the movable pin for limiting the movement thereof in both directions.

16. A gauge for determining dimensions comprising in combination, a frame, a contact pin at one end of the frame, means for adjusting the said pin inward or outward and locking it in adjusted position, a contact pin at the other end of the frame and movable inward or outward with respect thereto, means for moving the movable pin comprising an element rotatable about an axis perpendicular to the said pin and having a cam surface eccentric to its axis of rotation engaging the pin to positively move the same in both directions, and means associated with the movable pin for limiting the movement thereof in both directions.

17. A gauge for determining internal dimensions comprising in combination, a frame, a contact pin projecting outward at one end of the frame, a contact pin projecting outward at the other end of the frame and movable inward or outward with respect thereto, the said frame extending directly along straight lines from one pin to the other, means for moving the movable pin comprising an element rotatable about an axis perpendicular to the said pin and having a cam surface eccentric to its axis of rotation engaging the pin to positively move the same in both directions, and means associated with the movable pin for limiting the movement thereof in both directions.

18. A gauge for determining internal dimensions comprising in combination, a frame, a contact pin projecting outward at one end of the frame, means for adjusting the said pin inward or outward and locking it in adjusted position, a contact pin projecting outward at the other end of the frame and movable inward or outward with respect thereto, the said frame extending directly along straight lines from one pin to the other, means for moving the movable pin comprising an element rotatable about an axis perpendicular to the said pin and having a cam surface eccentric to its axis of rotation engaging the pin to positively move the same in both directions, and means associated with the movable pin for limiting the movement thereof in both directions.

In testimony whereof, I hereto affix my signature.

BRYANT H. BLOOD.